(12) United States Patent
Fukutani et al.

(10) Patent No.: US 6,700,256 B2
(45) Date of Patent: Mar. 2, 2004

(54) BRUSHLESS MOTOR AND PRODUCTION METHOD THEREFOR

(75) Inventors: Hideshi Fukutani, Yonago (JP); Hiroshi Ikeno, Yonago (JP); Norimasa Takata, Yonago (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 5 days.

(21) Appl. No.: 09/983,265

(22) Filed: Oct. 23, 2001

(65) Prior Publication Data

US 2002/0084704 A1 Jul. 4, 2002

(30) Foreign Application Priority Data

Oct. 23, 2000 (JP) ........................................ 2000-322308

(51) Int. Cl.⁷ .................................................. H02K 7/08
(52) U.S. Cl. ...................... 310/90; 310/67 R; 360/99.08
(58) Field of Search ................................. 310/90, 67 R; 360/99.04, 99.08, 99.12

(56) References Cited

U.S. PATENT DOCUMENTS 5,648,881 A * 7/1997 Yokouchi .................. 360/99.04
5,744,882 A * 4/1998 Teshima et al. ............ 310/67 R
5,875,069 A * 2/1999 Suzuki et al. ............. 360/99.04
6,501,617 B1 * 12/2002 Harada et al. ........... 360/99.08
6,534,889 B2 * 3/2003 Katagiri et al. ............... 310/91

FOREIGN PATENT DOCUMENTS

| JP | 63-29369 | 2/1988 |
| JP | 8-192285 | 7/1996 |
| JP | 8-289523 | 11/1996 |

* cited by examiner

*Primary Examiner*—Dang Le
(74) *Attorney, Agent, or Firm*—Wenderoth, Lind & Ponack, L.L.P.

(57) ABSTRACT

In a brushless motor, a projected annular portion is formed in a central portion of a rotor frame and the projected annular portion has a bore that includes a small-bore portion and a large-bore portion. A length L1 of the small-bore portion is in a range of $D \times 0.05 \leq L1 \leq D \times 0.20$, where D represents the diameter of the shaft. An axial length L2 of the projected annular portion is arranged to satisfy $L2 \geq L1 \times 2$. Thus, the brushless motor realizes a small and thin construction and has a high deflection precision as well as high productivity.

11 Claims, 5 Drawing Sheets

BRUSHLESS MOTOR AND PRODUCTION METHOD THEREFOR

BACKGROUND OF THE INVENTION

1. Field of the Invention

The present invention generally relates to a brushless motor, and in particular to a connection construction between a rotor frame, a turntable, a hub, a rotor boss, and the like, and a shaft of a brushless motor rotationally driven primarily with an information-recordable/reproducible disk such as a compact disk, a video disk, or a magnetic disk being mounted on the turntable, hub, or the like. Alternatively, the present invention relates to a connection construction between a rotor frame, a turntable, a hub, a rotor boss, and the like, and a shaft of a brushless motor rotationally driven with a load such as a rotational polygon mirror mounted thereon.

2. Description of the Prior Art

Figure 8:
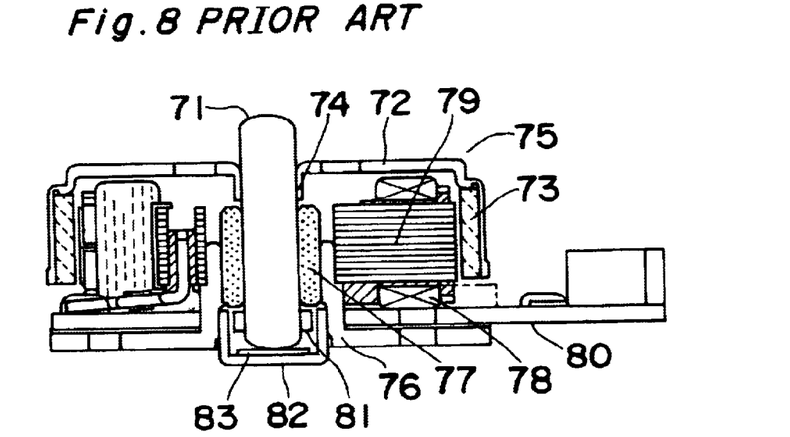
FIG. 8 is a cross-sectional view of a conventional brushless motor.
Figure 9A:
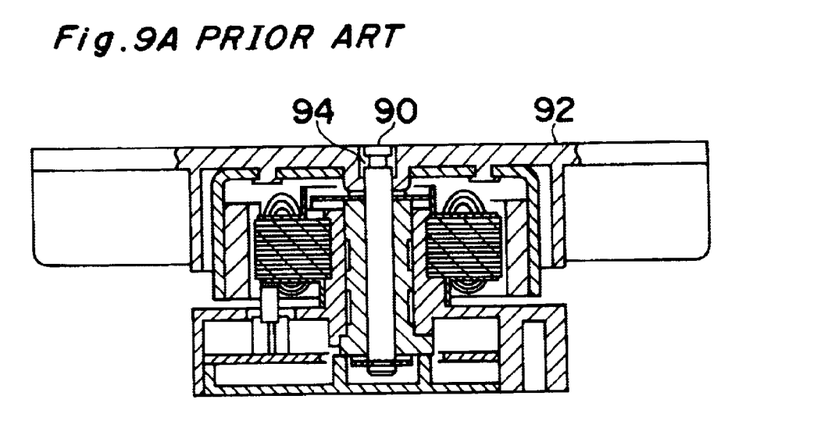
FIG. 9A is a cross-sectional view of another conventional brushless motor.
Figure 9B:
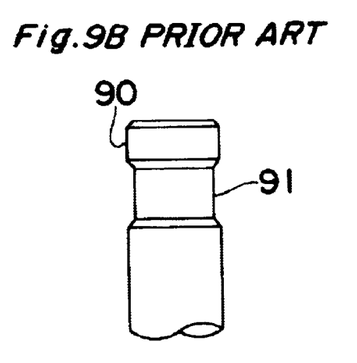
FIG. 9B is a detailed view of a part of the conventional brushless motor.
Figure 9C:
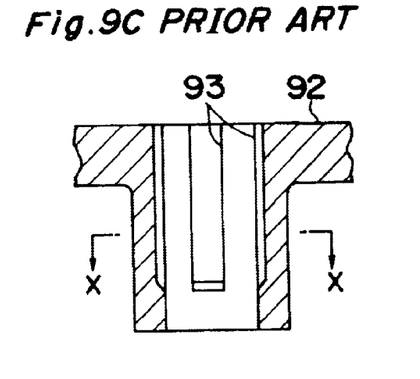
FIG. 9C is another detailed view of a part of the conventional brushless motor.
Figure 9D:
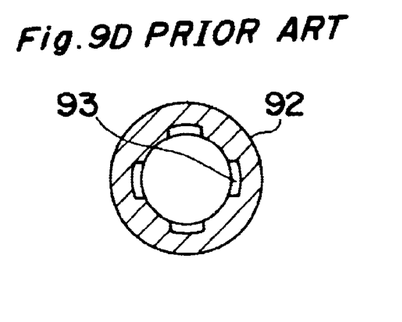
FIG. 9D is an X—X cross-sectional view of the portion in FIG. 9C.

A conventional brushless motor is disclosed in, for example, Japanese Patent Unexamined Laid-Open Publication 8-289523 (published in 1996). FIG. 8 shows a construction of the conventional brushless motor. FIG. 8. is a cross-sectional view of an embodiment of the conventional brushless motor. In FIG. 8, numeral 71 denotes a shaft for transmitting rotation. Numeral 72 denotes a rotor frame in which a ringular magnet 73 circumferentially multipolar-magnetized is fixed by performing either press-fitting or adhesion. A projected annular portion 74 is formed in a central portion of the rotor frame 72, and the shaft 71 is directly press-fitted thereinto. In this manner, a rotor assembly 75 is configured.

Numeral 76 denotes a bracket, in which a burring process is applied on a central portion of a steel plate so that a bearing housing is formed and a mounting-base function is integrated. A bearing 77 for rotationally supporting the shaft 71 is press-fixed inside a burring portion of the bracket 76. A stator core 78, which is wound with a stator coil 79 around an iron core via resin insulation, is press-fixed in an outer portion of the burring portion of the bracket 76. At least a part of a circuit for driving and controlling the motor is mounted on a printed circuit board 80, and the printed circuit board 80 is adhered and fixed via a double-side adhesive tape onto a planar portion of the bracket 76. An end of the stator coil 79 is wired on the printed circuit board 80. In this way, a stator assembly is constructed.

Numeral 81 denotes a disengagement-preventing piece for preventing thrust-directional disengagement of the rotational assembly, i.e., the rotor assembly 75, where the disengagement-preventing piece 81 is formed through metal-press processing and is press-fitted onto one end of the shaft 71. Numeral 82 denotes a bottom plate holding a thrust-directional load of the rotor assembly 75 and the bottom plate 82 is press-fitted and fixed at a burring-portion entrance of the bracket 76 via a thrust plate 83 formed of an abrasion-resistant resin.

As described above, the shaft 71 is directly press-fitted in the projected annular portion 74 positioned in the central portion of the rotor frame 72. Thus, the connection between the shaft and the frame is simplified and secured.

However, there are tendencies in which the overall size and the thickness are reduced for brushless motors that are used for information-recording and reproducing devices, such as compact disks, video disks, or magnetic disks, or brushless motors that are used for devices rotationally driven with a load such as a rotational polygon mirror being mounted. To meet requirements in the tendencies, however, when a projected annular portion of a rotor frame and a rotor boss that are connected to a shaft are reduced in length, the difficulty increases in maintaining the strengths of the connected portions.

In addition, in a technique for directly press-fitting, for example, the projected annular portion of the rotor frame onto the shaft, the precision of the rotor assembly depends on the precision of each component with the projected annular portion of the rotor frame. However, in the tendency requiring a higher-speed operation of an information-recording/reproducing device, such as a compact disk, a video disk, or a magnetic disk, the strictness of precision is increasing year by year in precision regarding deflective rotation of a rotational unit for a turntable and a rotor frame of a brushless motor. The strictness of the aforementioned precision is also increasing for a rotational unit such as a rotor boss of a brushless motor used for mounting, for example, a rotational polygon mirror. The conventional connections between a shaft and a rotor frame and between a shaft and a rotor boss therefore encounter difficulties in satisfying the requirements for high precision regarding the deflection.

Furthermore, it is increasingly necessary to obtain a high precision of circumferential portions of the projected annular portion of the rotor frame and the outer diameter portion of the rotor boss. The aforementioned precision is important to perform high-precision mounting of a clamping mechanism that is used for self-clamping an information-recording/reproducing disk such as a compact disk, a video disk, or a magnetic disk, or a rotational polygon mirror that is to be mounted onto the rotor boss.

However, problems are caused in performing accurate positioning and mounting operation because of variations in the outer diameters according to plastic deformation. The plastic deformation occurs on the circumferential portions of the projected annular portion of the rotor frame, the outer diameter of the rotor boss, or the like when the shaft is press-fitted.

In addition to the above-described conventional example, Japanese Utility Model Unexamined Laid-Open Publication No. 63-29369 (published in 1988) discloses another example a configuration of which is shown in FIGS. 9A, 9B, 9C, and 9D.

In this example, the configuration includes an annular groove 91 and a groove 93, as shown in FIGS. 9A, 9B, 9C, and 9D. The annular groove 91 is circumferentially formed on a rotational shaft 90. The groove 93 in the rotational-shaft direction is formed on a bore cylindrical wall of a rotational unit 92 provided adjacent to the annular groove 91. An adhesive 94 is filled into a gap between the annular groove 91 and the groove 93 formed in the direction of the rotational shaft, and the adhesive is then cured. In this way, the configuration is arranged such that the rotational shaft 90 and the rotational unit 92 are connected together to integrally rotate. By this arrangement, the configuration enables the implementation of a rotational unit that allows long-term stable quality to be maintained without an increased number of components, that facilitates assembly, and that produces reduced vibrations.

However, the above configuration requires the process of forming the annular groove. Furthermore, the configuration requires the annular groove to be formed in the rotational-shaft direction on the bore cylindrical wall. The configuration thus requires the complicated grooves to be formed.

This creates a problem in that the configuration is not economically advantageous.

When the shaft and the rotor frame are connected by using the adhesive, the centers thereof may deviate from each other because of the gap for adhesion. This deviation causes radial deflections on a clamping mechanism that is used for self-clamping an information-recording/reproducing disk (such as a compact disk, a video disk, or a magnetic disk), a rotor boss that is used for mounting a rotational polygon mirror, or the like. For this reason, a problem occurs in that a load member, such as a compact disk, a video disk, a magnetic disk, or a rotational polygon mirror, causes decentering with respect to the rotational center. During high-speed rotation of the rotor assembly, the decentering causes unbalanced rotation, and the unbalanced rotation causes great vibrations.

Another example is disclosed in Japanese Patent Unexamined Laid-Open Publication No. 8-192285 (published in 1996). In this case, the configuration is arranged such that a rotational shaft is inserted through an insertion hole of a rotor in a manner of a transition fit (i.e., intermediary fit) or a clearance fit (i.e., loose fit). Then, a laser beam is converged on a boundary portion between the insertion hole of the rotor and the rotational shaft to weld the boundary portion. Thereby, the insertion hole of the rotor and the rotational shaft are integrated at the boundary potion. Accordingly, the configuration enables the rotational shaft to be accurately fixed in the center of the rotor without requiring a press-fitting operation that causes deformation of the rotational shaft.

In this arrangement, however, a problem is caused in the method such that, since the insertion hole of the rotor and the rotational shaft are connected with the transition fit or the clearance fit, the centers thereof may deviate from each other because of the gap. This deviation causes radial deflections on a clamping mechanism that is used for self-clamping an information-recording/reproducing disk (such as a compact disk, a video disk, or a magnetic disk), a rotor boss that is used for mounting a rotational polygon mirror, or the like. This method causes another problem such that, because of the transition-fit or clearance-fit engagement between the insertion hole of the rotor and the rotational shaft, the insertion hole of the rotor and the rotational shaft are inserted and welded on jig facilities. This results in complicated jig facilities and the use of laser-emitting devices.

An object of the present invention is to solve the above-described problems involved in the conventional connection structure between the rotor frame and the shaft of the brushless motor and the connection between the rotor boss and the shaft of the brushless motor. That is, the present invention is presented to solve the problems of requirements for higher connection strengths while the connection lengths are reduced.

In addition, another object of the present invention is to solve the above-described problems in the connection between the rotor frame and the shaft of the brushless motor and the connection between the rotor boss and the shaft of the brushless motor; that is, the present invention satisfies the requirements for the deflective-rotation precision while the device-operation speed is increased.

Still another object of the present invention is to solve the problem of outer-diameter variations that occur according to the plastic deformation in the circumferential portions of, for example, the projected annular portion and the rotor boss. The plastic deformation is caused by the press-fitting operation.

Furthermore, by solving the problem of variations in the outer diameter, the present invention is able to provide a motor capable of rotating a load member, such as a disk or a rotational polygon mirror, with a high degree of precision.

SUMMARY OF THE INVENTION

To solve the above-described problems and to achieve the aforementioned objects, a first aspect of the present invention provides a brushless motor which comprises: a rotor assembly which includes a substantially cylindrical rotor frame, a magnet that is concentrically disposed in the rotor frame to form a cylindrical spacing, and a shaft having one end fixed in a rotational center of the rotor frame; and a bearing for supporting the rotor assembly. The rotor frame has a projected annular portion in a central portion thereof. The projected annular portion has a small-bore portion and a large-bore portion in a bore thereof, wherein an axial length L1 of the small-bore portion is in a range of $D \times 0.05 \leq L1 \leq D \times 0.20$ where D represents the diameter of the shaft.

According to the first aspect of the present invention, the length of the small-bore portion positioned on the bore side of the projected annular portion is arranged so as to be selected in an appropriate range to allow the shaft to be press-fitted and connected. Thus, since the press-fitting strength immediately after the press-fit connection can be maintained, therefor to a subsequent step can be performed immediately after the press-fitting connection.

In this arrangement, since the upper limit is specified for the length of the small-bore portion, no case occurs in which an excessively high press-fit load is applied. This enables a press-fitting step to be implemented with a simple tool.

In addition, the configuration may be arranged such that, with respect to the axial length L1 of the small-bore portion of the rotor frame, an axial length L2 of the projected annular portion formed in the central portion of the rotor frame may be in a range of $L2 \geq L1 \times 2$. The specific range is appropriate to allow the strength of the connection portion and deflection precision to be compatible.

In a case where the length is equal to or longer than the lower limit in the specified range, the connection strength either between the shaft and the rotor frame or between the shaft and the rotor boss can be maintained. This case is suitably subjected to a light press-fitting step. In a case where the length is equal to or less than the upper limit in the specified range, the connection strength either between the shaft and the rotor frame or between the shaft and the rotor boss can be set to be relatively high. This case is suitable for an assembly step in which the production tact is fast. Furthermore, when the axial length L2 of the projected annular portion is set sufficiently long in relation to the length L1 of the small-bore portion, a sufficient length of an adhesive portion can be obtained. Accordingly, sufficient adhesion strength can be secured, and consequently, the final strength of the connection portion can be increased.

A second aspect of the present invention provides a production method for a brushless motor having a rotor assembly that includes a shaft, a rotor frame having a projected annular portion in a central portion thereof where the projected annular portion has a small-bore portion and a large-bore portion in a bore thereof, and a magnet is concentrically disposed in the rotor frame and that forms a cylindrical spacing. The method comprises the steps of: press-fitting one end of the shaft into the small-bore portion; and filling an adhesive into a gap between the large-bore portion and the shaft to thereby connect the rotor frame to the shaft. According to the above-described production method for the brushless motor, the rotor frame is connected to the shaft, so that the rotor assembly of the brushless motor is produced.

A third aspect of the present invention provides a brushless motor which comprises: a rotor assembly which includes a shaft, a rotor boss having a central circular bore in which the shaft is inserted, a rotor frame fitted to the rotor boss, and a magnet that is concentrically disposed in the rotor frame so as to form a cylindrical spacing; and a bearing for supporting the rotor assembly. The rotor boss has a small-bore portion and a large-bore portion in the bore thereof, wherein an axial length L1 of the small-bore portion is in a range of $D \times 0.05 \leq L1 \leq D \times 0.20$ where D represents the diameter of the shaft.

According to the third aspect of the present invention, the shaft is press-fitted and connected to the small-bore portion positioned in the bore of the rotor boss. In this arrangement, since the press-fitting strength immediately after the press-fit connection can be maintained, handling in a subsequent step can be performed immediately after the press-fitting connection. Furthermore, since the upper limit is specified for the length of the small-bore portion, no case occurs in which an excessively high press-fit load is applied. This enables a press-fitting step to be performed with a simple tool.

In the above-described third aspect of the present invention, the configuration may be arranged such that, with respect to the length L1 of the small-bore portion of the rotor boss, an axial length L2 of the annular bore portion formed in the central portion of rotor boss is in a range of $L2 \geq L1 \times 2$. The specified range is appropriate to allow the strength of the connection portion and deflection precision to be compatible. In a case where the length is equal to or longer than the lower limit in the specified range, the connection strength either between the shaft and the rotor frame or between the shaft and the rotor boss can be maintained. This case is suitably subjected to a light press-fitting step.

In a case where the length is equal to or less than the upper limit in the specified range, the connection strength either between the shaft and the rotor frame or between the shaft and the rotor boss can be set to be relatively high. This case is suitable for an assembly step in which the production tact is fast. Furthermore, when the axial length L2 of the projected annular portion is set sufficiently long in relation to the length L1 of the small-bore portion, a sufficient length of an adhesive portion can be obtained. Accordingly, sufficient adhesion strength can be secured, and consequently, the final strength of the connection portion can be increased.

A fourth aspect of the present invention provides a production method for a brushless motor having a rotor assembly which includes a shaft, a rotor boss having a central circular bore in which the shaft is inserted, a rotor frame fitted to the rotor boss where the rotor boss has a small-bore portion and a large-bore portion in the bore thereof; and a magnet is concentrically disposed in the rotor frame to form a cylindrical spacing. The method comprises the steps of: press-fitting one end of the shaft into the small-bore portion; and filling an adhesive into a gap between the large-bore portion and the shaft to connect the rotor boss to the shaft. According to the above-described production method for the brushless motor, the rotor frame is connected to the shaft, so that the rotor assembly of the brushless motor is produced.

A fifth aspect of the present invention provides a brushless motor which comprises: a rotor assembly which includes a shaft, a rotor boss having a central circular bore in which the shaft is inserted, a rotor frame fitted to the rotor boss, and a magnet that is concentrically disposed in the rotor frame to form a cylindrical spacing. The rotor boss comprises a small-bore portion and a large-bore portion in the bore thereof, and one end of the shaft is press-fitted into the small-bore portion. An axial length L1 of the small-bore portion is in a range of $D \times 0.05 \leq L1 \leq D \times 0.20$ where D represents the diameter of the shaft, and wherein a connection boundary portion between the small-bore portion and the shaft or a connection boundary portion between the large-bore portion and the shaft is welded with laser beams to thereby connect the rotor boss to the shaft.

By this construction, the length of the small-bore portion positioned on the bore side of the rotor boss having the circular bore is arranged so as to be selected in an appropriate range to allow the shaft to be press-fitted and connected. According to this arrangement, since the press-fitting strength immediately after the press-fit connection can be maintained, handling in a subsequent step can be performed immediately after the press-fitting connection.

Furthermore, a connection boundary portion between the small-bore portion and the shaft or a connection boundary portion between the large-bore portion and the shaft is welded using laser beams to thereby connect the rotor boss to the shaft. This enables the precision to be maintained, and concurrently, enables the final strength of the connection portion to be increased.

A sixth aspect of the present invention provides a production method for -a brushless motor which includes a rotor assembly comprising a shaft, a rotor boss having a central circular bore in which the shaft is inserted, a rotor frame fitted to the rotor boss where the rotor boss has a small-bore portion and a large-bore portion in the bore thereof, and a magnet concentrically disposed in the rotor frame so as to form a cylindrical spacing. The method comprises the steps of: forming a small-bore portion and a large-bore portion in the bore of the rotor boss; press-fitting one end of the shaft into the small-bore portion; welding one of a connection boundary portion between the small-bore portion and the shaft and a connection boundary portion between the large-bore portion and the shaft with laser beams to thereby connect the rotor boss to the shaft.

According to the above-described production method for the brushless motor, the rotor boss is connected to the shaft, so that the rotor assembly of the brushless motor is produced.

In the above-described sixth aspect of the present invention, the configuration may be arranged such that the laser welded portion of the connection boundary portion may be an overall circumference of the shaft. In this way, different from a case where partial spot welding is performed, welding is performed entirely along the overall circumference of the shaft. Thereby, sufficient weld strength can be secured, and the final strength of the connection portion can be increased.

DETAILED DESCRIPTION OF THE PREFERRED EMBODIMENTS

Embodiments of the present invention will be described hereinbelow with reference to FIGS. 1 to 7. It is noted that like parts are denoted by like reference numerals throughout the drawings.

Embodiment 1

Figure 1:
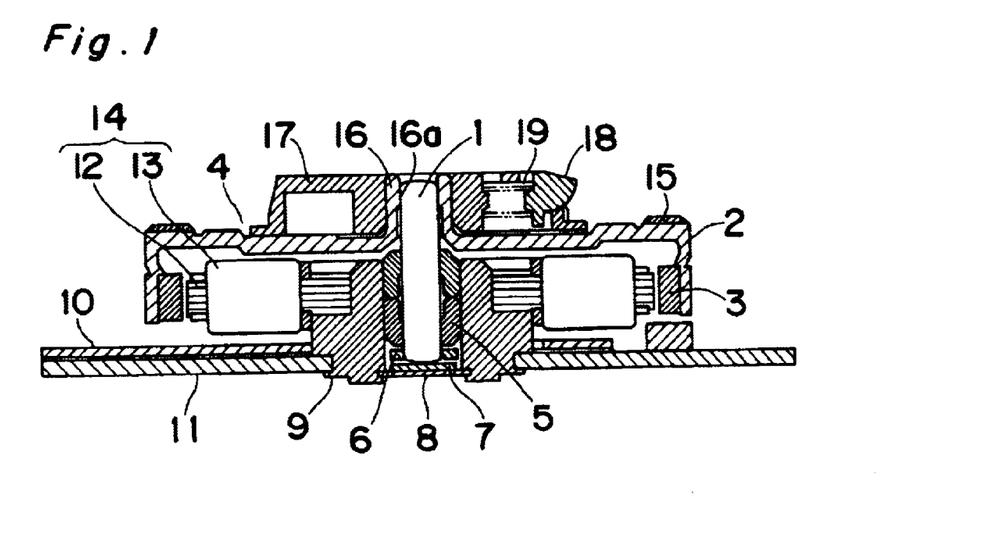
FIG. 1 is a cross-sectional view of a brushless motor according to an embodiment of the present invention.

FIG. 1 shows a configuration in cross-section of a brushless motor (which hereinbelow will also simply be referred to as a motor).

A shaft 1 is fixed in a rotational center of a cylinderical rotor frame 2. In the rotor frame 2, a magnet 3 is concentrically disposed on a circumferential wall portion of the rotor frame 2, forming a cylindrical spacing. A rotor assembly 4 is thus configured of the shaft 1, rotor frame 2 and magnet 3. The rotor assembly 4 is then inserted into a bearing 5. A disengagement-preventing piece 6 is press-fitted on one end of the shaft 1 to prevent axial disengagement of the rotor assembly 4. Numeral 7 denotes a thrust plate for holding a thrust-directional load of the rotor assembly 4, and is formed of an abrasion-resistant resin. In addition, a thrust cover 8 formed of a metal plate is disposed under the thrust plate 7, and is fixedly engaged with a metal housing 9. Thus, the rotor assembly 4 is radially and axially supported by the bearing 5 and the thrust plate 7 so as to be rotatable.

In the metal housing 9, one or more pieces of the bearing 5 is fitted via a spacing provided therebetween in the axial direction. At one end of the metal housing 9, there is mounted a bracket 11 onto which a printed circuit board 10 is adhered. The printed circuit board 10 is provided with at least a part of the circuits for driving the motor and controlling the drive thereof. At another end of the metal housing 9, there is provided a stator core 12 on which a magnetic substance configuring a magnetic path with the magnet 3 is overlaid. The stator core 12 is wound with a stator coil 13 opposing the magnet 3, thereby generating electromagnetic torque. A stator winding 14 is thus configured of the stator coil 13 and stator core 12.

The cylindrical rotor frame 2 is manufactured by press-forming a steel plate material. On a planar face of the rotor frame 2, a TT cushion 15 is formed for receiving a recordable/reproducible disk (not shown), and a projected annular portion 16 is formed in a central portion of the rotor frame 2. The projected annular portion 16 has a central circular bore 16a in which the shaft 1 is inserted in a fitting manner. A disk-holding ring 17 has a function of radially positioning the disk (not shown). The disk-holding ring 17 has a bore that accommodates a tab 18 to allow the disk (not shown) to rotate in a state in which it is pushed onto the TT cushion 15. A tab spring 19 urges the tab 18 to push the disk (not shown) in the radial direction and in the axial direction.

Hereinbelow, a description will be made regarding a rotational operation of the motor configured as described above for an information recording/reproducing device such as a compact disk or a videodisk.

First, when current is supplied to the stator coil 13, an electromagnetic force is generated in a field between the stator coil 13 and the magnet 3. The electromagnetic force rotates the rotor assembly 4 around the shaft 1 as the center, where the shaft 1 is axially held by the bearing 5. Thus, the disk (not shown) is rotated while being clamped by the disk-holding ring 17, the tab 18, and the tab spring 19 that are fixed to the rotor assembly 4. This operation allows implementations of the functions of writing, and reading information on the disk.

Figure 2:
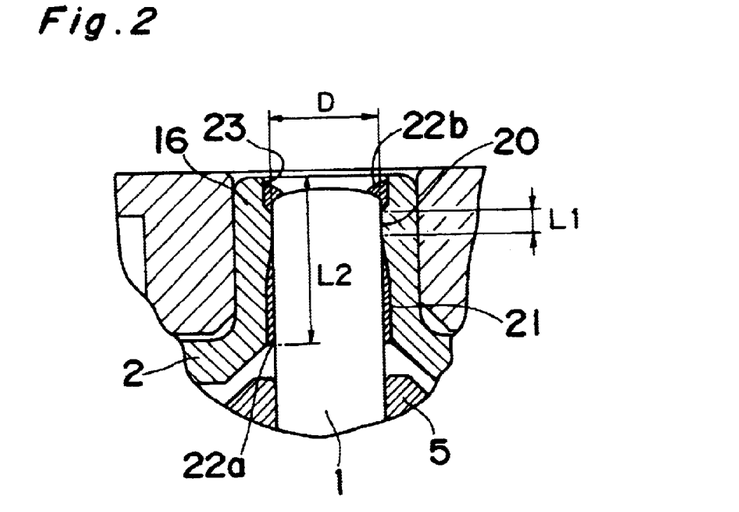
FIG. 2 is a detailed cross-sectional view of a part of the brushless motor according to the embodiment shown in FIG. 1 of the present invention.

FIG. 2 shows a detailed essential portion of the motor shown in FIG. 1 according to the present embodiment. FIG. 2 is used to explain a configuration of a connection portion between the shaft 1 and the rotor frame 2 of the rotor assembly 4 that is a major portion of the present invention.

In FIG. 2, the projected annular portion 16 is formed in a central portion of the rotor frame 2. In addition, a small-bore portion 20 having a smaller inner diameter and a large-bore portion 21 having a larger inner diameter are formed in a bore of the projected annular portion 16. The inner diameter of the small-bore portion 20 is substantially equal to a diameter D of the shaft 1 so that the small-bore portion 20 closely contacts the shaft 1 upon press-fitting them. The inner diameter of the large-bore portion 21 is gradually increased toward the lower part thereof below the small-bore portion 20 and is slightly larger than the diameter D of the shaft 1. Thus, the large-bore portion 21 loosely contacts the shaft 1 when fitting with the shaft 1 by insertion. There is also formed a stepped large-bore portion 23 having a stepped larger inner diameter which is formed at an upper-most portion in the bore 16a of the projected annular portion 16.

The small-bore portion 20 is formed so as to have a length L1 in an axial direction (perpendicular direction in the drawing). The length L1 is in a range of $D \times 0.05 \leq L1 \leq D \times 0.20$ where D represents the diameter of the shaft 1. On the other hand, an axial length L2 of the projected annular portion 16 is set to satisfy $L2 \geq L1 \times 2$.

The shaft 1 is press-fitted into the small-bore portion 20 positioned in the bore of the projected annular portion 16 of the rotor frame 2. Before the shaft 1 is press-fitted into the small-bore portion 20, a thermosetting and anaerobic adhesive 22a is preliminarily applied in the large-bore portion 21. The adhesive 22a has a maximum thickness of, for example, 0.05 mm at the lowermost position thereof.

After the shaft 1 is press-fitted into the bore of the projected annular portion 16, a thermosetting and anaerobic adhesive 22b is fed to the stepped large-bore portion 23 to securely contact the circumeferential top periphery of the shaft 1. That is, the adhesive 22b is fed entirely along the overall circumference of the top of the shaft.

Embodiment 2

Figure 3:
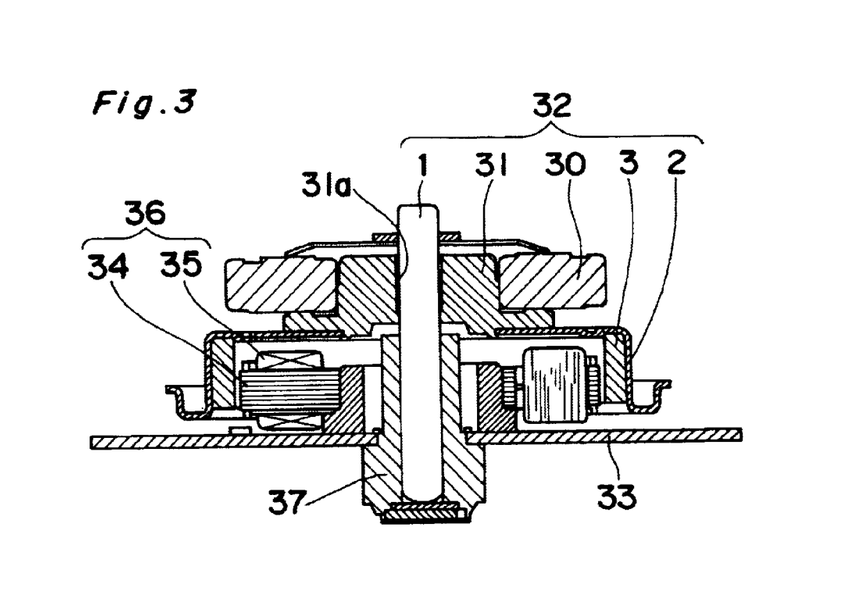
FIG. 3 is a detailed cross-sectional view of a brushless motor according to another embodiment of the present invention.

FIG. 3 shows a configuration in cross-section of a motor according to another embodiment of the present invention.

In FIG. 3, numeral 1 denotes a shaft. A rotational polygon mirror 30, a magnet 3, and a rotor frame 2 are fixed to a rotor boss 31. The rotor boss 31 is fixed to the shaft 1 by using combined methods of press-fitting and adhesion. The rotor boss (31) has a circular bore 31a in the central portion thereof in which the shaft 1 is inserted. In this way, a rotor assembly 32 is comprised of the shaft 1, rotor frame 2, magnet 3, rotational polygon mirror 30 and rotor boss 31.

On the other hand, a bracket 33 having a mounting portion of a rotational-polygon-mirror driving unit is an aluminum substrate having a high thermal conductivity. A stator winding 36 is configured such that a stator coil 34 for generating electromagnetic torque in opposition to the magnet 3 is wound on a stator core 35 on which a magnetic substance is deposited for forming a magnetic path in cooperation with the magnet 3. The stator winding 36 and a driving IC (not shown) for driving the rotational-polygon-mirror driving unit are mounted on the bracket 33. In this way, a stator assembly is configured.

A herringbone groove is formed on an inner wall of a bearing 37 to form a hydraulic bearing, and the shaft 1 is thereby rotatably held. In the configuration, the bearing 37 is directly caulked to the bracket 33.

Hereinbelow, a description will be made regarding the operation of the rotational-polygon-mirror driving unit configured as described above.

First, when current is supplied to the stator coil 34, an electromagnetic force is generated in a field between the stator coil 34 and the magnet 3. The electromagnetic force rotates the rotor assembly 32 around the shaft 1 as the center, which is held by the bearing 37. Then, polarization scanning is performed with a laser light emitted from the rotational polygon mirror 30 that is fixed to the rotor assembly 32.

Modified Examples

FIGS. 4, 5, 6, and 7 show modified examples of the major portion of the motor shown in FIG. 3. Each of these figures is used to explain a configuration of a connection portion between the shaft 1 and the rotor boss 31 of the rotor assembly 32.

Figure 4:
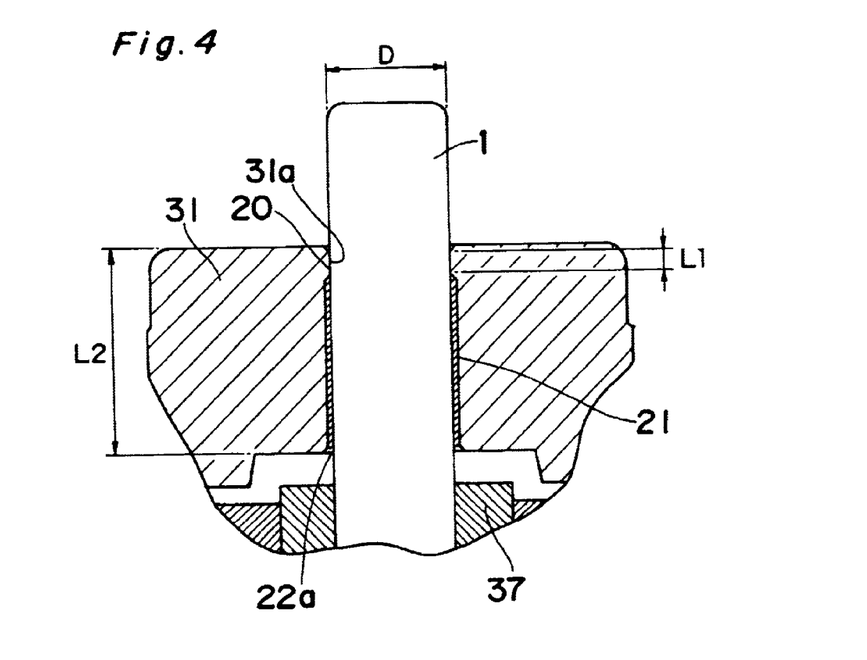
FIG. 4 is a detailed cross-sectional view of a part of a brushless motor according to another embodiment of the present invention;.

In an example shown in FIG. 4, the rotor boss 31 is formed by cutting a metal material such as a brass material or an aluminum material that has a high degree of machinability. The rotor boss 31 has a circular bore formed in a central portion. A rotor frame (not shown) accommodating a magnet (not shown) is fixed. In the circular bore provided in the central portion of the rotor boss 31, a small-bore portion 20 defining a small inner diameter is formed in a portion positioned in an upper portion of the rotor boss 31, and a large-bore portion 21 defining a large inner diameter is formed in a major portion of the rotor boss 31 except for the position of the small-bore portion 20.

The small-bore portion 20 is formed with a length L1 in an axial direction which is in a range of $D\times0.05 \leq L1 \leq D\times0.20$ where D represents the diameter of the shaft 1.

An axial length L2 of the rotor boss 31 has a relationship with respect to the length L1 of the small-bore portion 20 represented by $L2 \geq L1\times 2$.

The shaft 1 is press-fitted into the small-bore portion 20 of the rotor boss 31 so as to be integrated with each other. Before the shaft 1 is press-fitted into the small-bore portion 20, a thermosetting and anaerobic adhesive 22a is preliminarily applied in the large-bore portion 21. Preferably, the adhesive 22a may have a thickness in a range of 0.005 to 0.05 mm.

Figure 5:
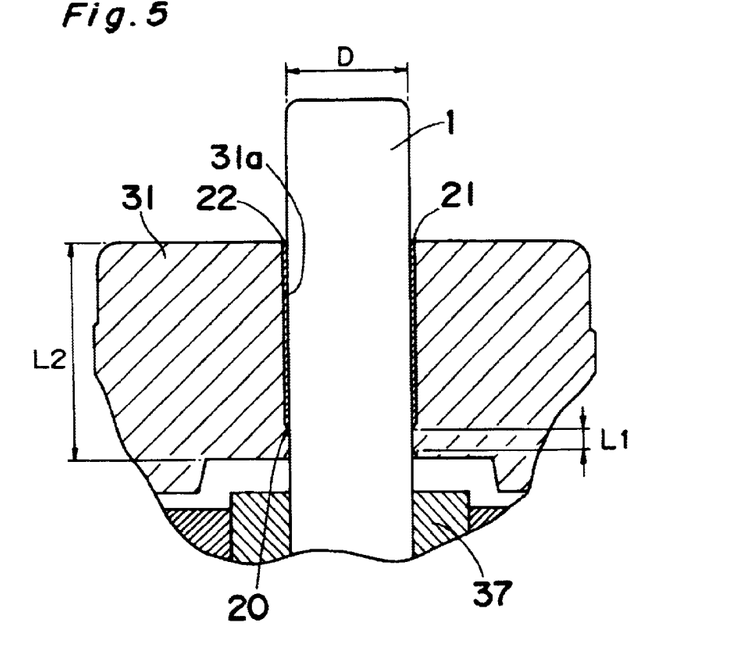
FIG. 5 is a detailed cross-sectional view of a part of a brushless motor according to another embodiment of the present invention.

In another example shown in FIG. 5, the rotor boss 31 has a circular bore provided in a central portion. A rotor frame (not shown) accommodating a magnet (not shown) is fixed. In the circular bore provided in the central portion of the rotor boss 31, a small-bore portion 20 is formed in a portion positioned in a lower portion of the rotor boss 31, and a large-bore portion 21 is formed in a major portion of the rotor boss 31 except for the position of the small-bore portion 20.

The small-bore portion 20 is formed with an axial length L1 in a range of $D\times0.05 \leq L1 \leq D\times0.20$ where D represents the diameter of the shaft 1. An axial length L2 of the rotor boss 31 has a relationship represented by $L2 \leq L1\times 2$ with respect to the length L1 of the small-bore portion 20.

The shaft 1 is press-fitted into the small-bore portion 20 of the rotor boss 31 so as to be integrated with each other. Before the shaft 1 is press-fitted into the small-bore portion 20, a thermosetting and anaerobic adhesive 22 is preliminarily applied into the large-bore portion 21. Preferably, the adhesive 22 may have a thickness in a range of 0.005 to 0.05 mm.

As described above, the shaft 1 is lightly press-fitted into the small-bore portion 20. Thereby, a press-fit strength is immediately generated between the shaft 1 and the rotor frame 2 as well as the rotor boss 31. Consequently, the assembly can be sent to a subsequent step immediately after the press-fitting operation, thereby improving the productivity in production steps. In addition, the final strength is increased according to the adhesion strength occurring between the shaft 1 and the large-bore portion 21, allowing a required strength to be maintained. This enables the strength to be secured also after product completion.

Furthermore, by employing the press-fitting operation, a gap is not formed between the shaft and the rotor boss or between the shaft and rotor frame. Thereby, improvement can be implemented for radial deflection. Consequently, this enables suppression of unbalanced vibrations during high-speed rotation of a load member, such as a compact disk, videodisk, or a rotational polygon mirror.

Moreover, a high connection strength is maintained, and concurrently, requirements for high productivity can be satisfied.

Figure 6:
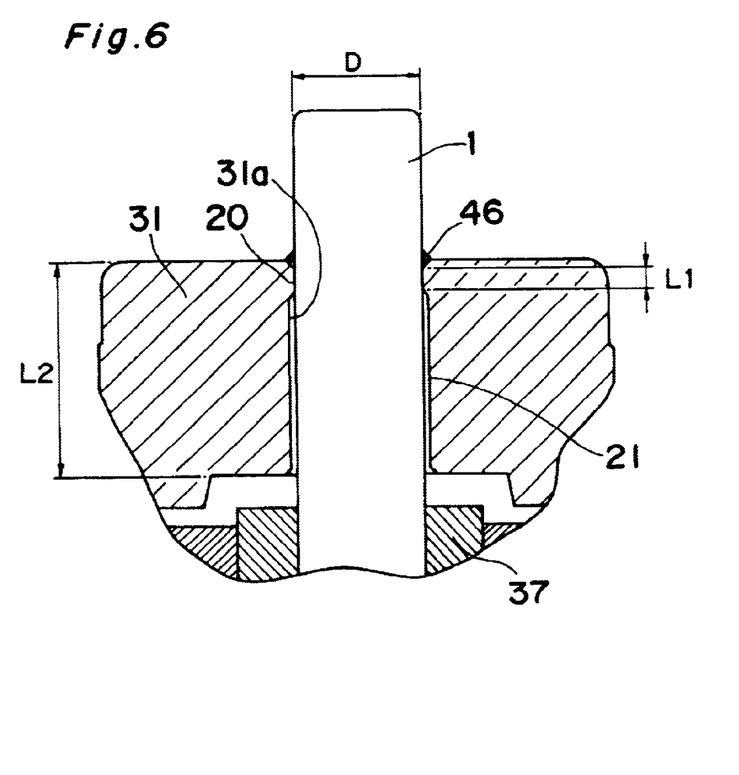
FIG. 6 is a detailed cross-sectional view of a part of a brushless motor according to another embodiment of the present invention.

In another example shown in FIG. 6, the rotor boss 31 is produced by cutting a metal material such as a stainless steel material. The rotor boss 31 has a circular bore provided in a central portion. A rotor frame (not shown) accommodating a magnet (not shown) is fixed. In the circular bore provided in the central portion of the rotor boss 31, the small-bore portion 20 is formed in an upper portion of the rotor boss 31, and the large-bore portion 21 is formed in a major portion of the rotor boss 31 except for the position of the small-bore portion 20.

The small-bore portion 20 is formed with an axial length L1 in a range of $D\times0.05 \leq L1 \leq D\times0.20$ where D represents the diameter of the shaft 1.

An axial length L2 of the rotor boss 31 has a relationship represented by $L2 \geq L1\times 2$ with respect to the length L1 of the small-bore portion 20.

The shaft 1 is press-fitted into the small-bore portion 20 of the rotor boss 31 so as to be integrated with each other. Laser beams are emitted so as to be supplied at a connection boundary portion between the small-bore portion 20 and the shaft 1. Then, weld-fitting is performed to form a weld-fitted portion 46, so that the rotor boss 31 and the shaft 1 are thereby integrated with each other.

Figure 7:
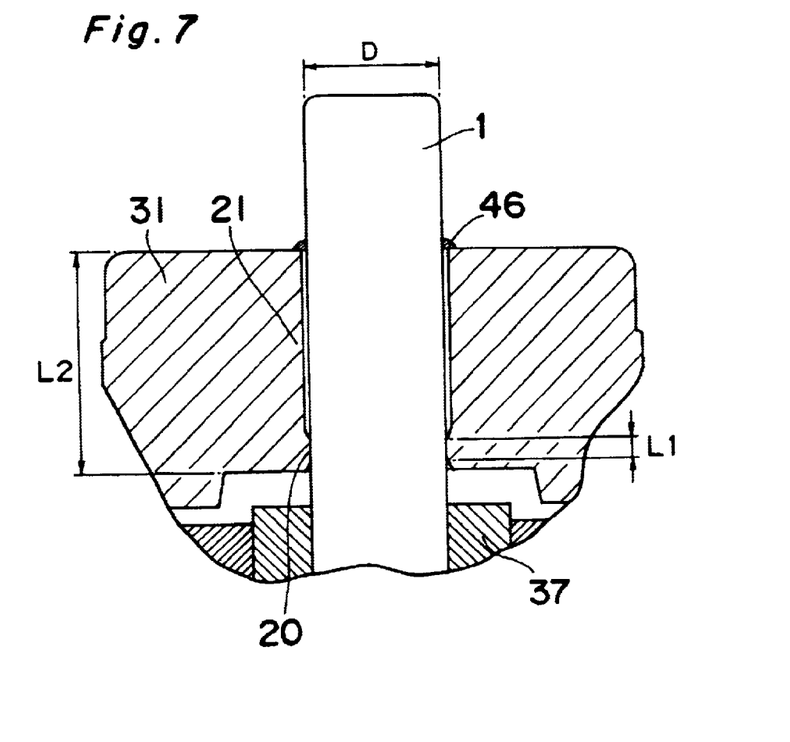
FIG. 7 is a detailed cross-sectional view of a part of a brushless motor according to another embodiment of the present invention.

In another example shown in FIG. 7, the rotor boss 31 is produced by cutting a metal material such as a stainless steel material. The rotor boss 31 has a circular bore provided in a central portion thereof. A rotor frame (not shown) accommodating a magnet (not shown) is fixed. In the circular bore provided in the central portion of the rotor boss 31, the small-bore portion 20 is formed in a a lower portion of the rotor boss 31, and the large-bore portion 21 is formed in a major portion of the rotor boss 31 except for the position of the small-bore portion 20

The small-bore portion 20 is formed with an axial length L1 in a range of D×0.05≦L1 D×0.20 where D represents the diameter of the shaft 1.

An axial length L2 of the rotor boss 31 has a relationship represented by L2≧L1×2 with respect to the length L1 of the small-bore portion 20.

The shaft 1 is press-fitted into the small-bore portion 20 of the rotor boss 31 so as to be integrated with each other. Laser beams are emitted so as to be supplied to a connection boundary portion between the small-bore portion 21 and the shaft 1. Then, weld-fitting is performed to form a weld-fitted portion 46, so that the rotor boss 31 and the shaft 1 are thereby integrated with each other.

In the examples shown in FIG. 6 or 7, the weld portion with the connection boundary portion between the small-bore portion 20 and the shaft 1 or the connection boundary portion between the large-bore portion and the shaft is an overall circumference of the shaft. In this way, different from a case where partial spot welding is performed, the welding of the present invention is performed entirely along the overall circumference of the shaft. Thereby, sufficient weld strength can be secured, and the final strength of the connection portion can be increased.

Moreover, since the small-bore portion 20 and the shaft 1 are lightly press-fitted, a press-fit strength is generated immediately after the press-fitting operation. Therefore, the rotor boss 31 and the shaft 1 need not be regulated by a jig and can be welded. This avoids the necessity of a position-control jig for maintaining the precision.

As described above, since the shaft 1 is lightly press-fit into the small-bore portion 20 of the rotor boss 31, a press-fit strength is immediately generated between the shaft 1 and the rotor boss 31. This enables the assembly to be sent to a subsequent processing step immediately after the press-fitting operation, which results in improvement of the productivity in the production steps. Moreover, the final strength is increased through the weld-fitting performed using laser light emitted so as to be applied at the interface portion between the shaft 1 and either the large-bore portion 21 or the small-bore portion 20, and thus a required strength can thereby be maintained. This enables the strength to be secured even after product completion.

Furthermore, because of the press-fitting, a gap is not formed between the shaft and the rotor frame, thereby enabling improvement of the product regarding radial deflection. Consequently, this inhibits unbalanced vibrations during high-speed rotation of a load member, such as a compact disk, a videodisk, or a rotational polygon mirror.

Still furthermore, the high connection strength is maintained, and concurrently, requirements for high productivity can be satisfied.

With the above, the object is achieved to provide the small and thin brushless motor that enables the connection strength to be maintained, and compatibly, a high degree of precision to be obtained.

It is noted that the light press-fitting refers to press-fitting to be performed at relatively low pressure for the shaft 1 into the rotor frame 2 and the small-bore portion 20 of the rotor boss 31. More specifically, the light press-fitting refers to press-fitting performed using a pressure whereby even when the shaft 1 is press-fitted into the rotor frame 2 or the rotor boss 31, no substantial change occurs on either circumferential potions of the small-bore portion 20 of the rotor frame 2 or circumferential potions of the rotor boss 31.

Furthermore, L1 is set to a short range of from 0.05 to 0.2 of the diameter D of the shaft 1. For this reason, even when rotational deflection has occurred with, for example, the body of either the rotor frame or the rotor boss, with respect to the bore provided in the bore portion of the rotor frame or the rotor boss, press-fitting can be performed by correcting the rotational deflection through setting-adjustment of the press-fitting jig. Consequently, even with a low deflective-rotation precision of the body of either the rotor frame or the rotor boss, post-press-fitting precision can be secured.

In particular, in the example shown in FIG. 2, the shaft diameter D is set to 2 mm, and L1 is set to 0.3 mm. L1 set to 0.3 mm corresponds to D×0.15. In addition, the axial length L2 of the overall projected annular portion that is set to 2.9 mm corresponds to L1×9.7. An appropriate interference (radial length) of the light-press-fitting shown in FIG. 2 is in a range of from 0.003 to 0.015 mm. While the press-fitting force is increased, the interference can be increased to a maximum of 0.025 mm without causing a problem.

In each of the examples shown in FIGS. 4 to 7, the shaft diameter D is set to 3 mm, and L1 is set to 0.45 mm. L1 set to 0.45 mm corresponds to D×0.15. In addition, the axial length L2 of the overall projected annular portion that is set to 4 mm corresponds to L1×8.9. An appropriate interference (radial length) of the light-press-fitting shown in each of FIGS. 4 and 5 is in a range of from 0.003 to 0.015 mm. While the press-fitting force is increased, the interference can be increased to a maximum of 0.025 mm without causing a problem.

In addition, due to the tendency in which an information-recording/reproducing device, such as a compact disk, a video disk, or a magnetic disk, is made smaller and thinner, even when the length L2 of the projected annular portion 16 of the rotor frame 2 or the length L2 of the bore of the rotor boss 31 are reduced, the strength of the connection portion can be maintained.

Furthermore, as shown in FIG. 2, a configuration can be implemented in which an excessive part of the adhesive 22a applied in the large-bore portion 21 heaps in upper portions of the large-bore portion 21 to increase the adhesion area. The increased adhesion area increases the adhesion strength.

In particular, the length L1 of the small-bore portion 20 of the projected annular portion 16 that is press-fitted is set to the length of L2≧L1×2. Accordingly, the length L1 of the small-bore portion 20 is set to be sufficiently long with respect the axial length L2 of the projected annular portion 16. In this case, since the press-fitting force is low, the processing can be performed by a simplified facility and short-time steps. In addition, in the above-described present embodiments, the adhesive 22a is not specifically limited to a specific type, and for example, ultraviolet curing adhesive provides equivalent effects.

As is apparent from the above description, according to the brushless motor of the present invention, in view of the tendency of making devices smaller and thinner, even when a rotor-frame projected annular portion to be connected to the shaft is short, the strength of the connection portion can be maintained. Consequently, the device and the brushless motor can be miniaturized.

Furthermore, the small-bore portion is appropriately set, and a light press-fitting technique is applied for press-fitting the shaft into the rotor frame and the rotor boss. Thereby, deformation in a projected annular portion of the rotor frame and in a circumferential portion of the rotor boss can be suppressed. This enables the provision of a brushless motor having a high degree of deflection precision both in the radial and axial directions.

What is claimed is:

1. A brushless motor comprising:
   a rotor assembly which includes a substantially cylindrical rotor frame, a magnet that is concentrically disposed in the rotor frame to form a cylridrical spacing, and a shaft having one end fixed in a rotational center of the rotor frame; and
   a bearing for supporting the rotor assembly,
   wherein the rotor frame has a projected annular portion in a central portion thereof, the projected annular portion having a bore defining a small-bore portion and a large-bore portion which is spaced from an outer peripheral surface of the shaft, wherein an axial length $L1$ of the small-bore portion is in a range of $D \times 0.05 \leq L1 \leq D \times 0.20$ where D represents the diameter of the shaft.

2. The brushless motor according to claim 1, wherein with respect to the axial length $L1$ of the small-bore portion of the rotor frame, an axial length $L2$ of the projected annular portion formed In the central portion of the rotor frame satisfies a relationship of $L2 \geq L1 \times 2$.

3. The brushless motor according to claim 1, further comprising a thermosetting and anerobic adhesive disposed in the spacing between the large-bore portion and the outer peripheral surface of the shaft.

4. The brushless motor according to claim 1, wherein the shaft is a solid cylindrical member having a constant outer diameter at least at the locations of the shaft that oppose the small-bore and large-bore portions of the projected annular portion.

5. A brushless motor comprising:
   a rotor assembly which includes a shaft, a rotor boss having a central circular bore in which the shaft is inserted, a rotor frame fitted to the rotor boss, and a magnet that is concentrically disposed in the rotor frame so as to form a cylindrical spacing; and
   a bearing for supporting the rotor assembly,
   wherein the rotor boss has a bore defining a small-bore portion and a large-bore portion which is spaced from an outer peripheral surface of the shaft, wherein an axial length $L1$ of the small-bore portion is in a range of $D \times 0.05 \leq L1 \leq D \times 0.20$ where D represents the diameter of the shaft.

6. The brushless motor according to claim 5, wherein with respect to the axial length $L1$ of the small-bore portion of the rotor boss, an axial length $L2$ of the bore formed in the central portion of rotor boss satisfies a relationship of $L2 \geq L1 \times 2$.

7. The brushless rotor according to claim 5, further comprising a thermosetting and anerobic adhesive disposed in the spacing between the large-bore portion and the outer peripheral surface of the shaft.

8. The brushless motor according to claim 5, wherein the shaft is a solid cylindrical member having a constant outer diameter at least at the locations of the shaft that oppose the small-bore and large-bore portions of the rotor boss.

9. A brushless motor comprising:
   a rotor assembly which includes a shaft, a rotor boss having a central circular bore in which the shaft is inserted, a rotor frame fitted to the rotor boss, and
   a magnet that is concentrically disposed in the rotor frame so as to form a cylindrical spacing.
   wherein the circular bore of the rotor boss comprises a small-bore portion and a large-bore portion which is spaced from an outer peripheral surface of the shaft, and one end of the shaft is press-fitted into the small-bore portion;
   wherein an axial length $L1$ of the small-bore portion is in a range of $D \times 0.05 \leq L1 \leq D \times 0.20$ where D represents the diameter of the shaft; and
   wherein one of a connection boundary portion between the small-bore portion and the shaft and a connection boundary portion between the large-bore portion and the shaft is welded with laser beams to thereby connect the rotor boss to the shaft.

10. The brushless motor according to claim 9, wherein the welding portion of the connection boundary portion extends along the entire circumference of the shaft.

11. The brushless motor according to claim 9, wherein the shaft is a solid cylindrical member having a constant outer diameter at least at the portions of the shaft that oppose the small-bore and large-bore portions of the rotor boss.

* * * * *